(12) United States Patent
Bezbaruah et al.

(10) Patent No.: US 9,015,849 B1
(45) Date of Patent: Apr. 21, 2015

(54) METHOD AND APPARATUS FOR PREVENTING DATA LEAKAGE OF E-DISCOVERY DATA ITEMS

(75) Inventors: Angshuman Bezbaruah, Pune (IN); Prabhat Singh, Pune (IN); Ankur Panchbudhe, Pune (IN)

(73) Assignee: Symantec Corporation, Mountain View, CA (US)

( * ) Notice: Subject to any disclaimer, the term of this patent is extended or adjusted under 35 U.S.C. 154(b) by 852 days.

(21) Appl. No.: 12/211,759

(22) Filed: Sep. 16, 2008

(51) Int. Cl.
*G06F 21/10* (2013.01)
*G06Q 10/10* (2012.01)

(52) U.S. Cl.
CPC .............. *G06F 21/10* (2013.01); *G06Q 10/107* (2013.01)

(58) Field of Classification Search
CPC ...... G06F 21/10; G06F 21/60; G06F 21/6218
See application file for complete search history.

(56) References Cited

U.S. PATENT DOCUMENTS

| 2008/0229037 A1* | 9/2008 | Bunte et al. ................. 711/162 |
| 2008/0307489 A1* | 12/2008 | Hubbard ........................ 726/1 |
| 2009/0150866 A1* | 6/2009 | Schmidt ...................... 717/120 |
| 2009/0150906 A1* | 6/2009 | Schmidt et al. .............. 719/317 |

\* cited by examiner

*Primary Examiner* — Alexander Lagor
(74) *Attorney, Agent, or Firm* — Wilmer Cutler Pickering Hale and Dorr LLP

(57) ABSTRACT

A method and apparatus for preventing data leakage of e-discovery data items is provided. In one embodiment, the method for automatically configuring e-discovery data for data leakage prevention includes processing filtering information regarding at least one e-discovery data item that is selected for data leakage prevention and generating data leakage prevention information for the selected at least one e-discovery data item, wherein the data leakage prevention information is used to filter the at least one data item.

12 Claims, 3 Drawing Sheets

METHOD AND APPARATUS FOR PREVENTING DATA LEAKAGE OF E-DISCOVERY DATA ITEMS

BACKGROUND

1. Field of the Invention

Embodiments of the present invention generally relate to data protection and archival systems and, more particularly, to a method and apparatus for configuring e-discovery data items for data leakage prevention.

2. Description of the Related Art

In a computing environment for an organization, a significant amount of data is stored in data storage systems (e.g. a repository). The data may be confidential and/or privileged to the organization. The amount of the data is due to the rapid growth in the size of the organization leads to inefficient management of the data for example, difficulty in discovery of the data during several proceedings like litigation, legal compliance and the like. As a result, the data is stored in the repository for future use. Subsequently, the data may be subject to legal review during a litigation/case. But, such data is vulnerable to leakage. Further, a rise in number of computing points (e.g., computers and servers) and easier modes of communication (e.g., Instant Messenger (IM), Universal Serial Bus (USB), cell phones) results in accidental or even intentional data leakage within or outside the organization.

Current Data Leakage Prevention (DLP) software is configured with pre-defined rules to detect and/or to prevent the unauthorized actions including transmission of the data within or outside the organization. The rules in the DLP software are framed on the basis of what the organization perceives as confidential or privileged data for that organization and thus, the rules may differ for different organizations. In addition, the DLP software helps in identification of the privileged data like the organization's Intellectual property, personal identifiable information like social security number and credit card number, health records and the like.

Consequently, the confidential and/or privileged data that may not be defined by the rules of the DLP software are at risk of being leaked even after utilizing the DLP software. For example, data under legal hold (during litigation) may be considered as the confidential data. As an example, when a data item is reviewed in the context of a court case, the data item may be identified as attorney client communication and hence, marked or selected as "privileged" by e-discovery software. The data item may be selected manually by legal reviewers or automatically by a classification engine in the e-discovery software (e.g., SYMANTEC Discovery Accelerator). The data item, however, is not automatically configured for data leakage prevention. Furthermore, data that is to be produced in a court of law (e.g., affidavits, motions and/or the like) are not prevented from being leaked to unwanted parties.

Therefore, there is a need in the art for a method and apparatus for preventing data leakage of e-discovery data items.

SUMMARY OF THE INVENTION

Embodiments of the present invention comprise a method and apparatus for preventing data leakage prevention of e-discovery data items. In one embodiment, a method for automatically configuring e-discovery data for data leakage prevention includes processing filtering information regarding at least one e-discovery data item that is selected for data leakage prevention and generating data leakage prevention information for the selected at least one e-discovery data item, wherein the data leakage prevention information is used to filter the at least one data item.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
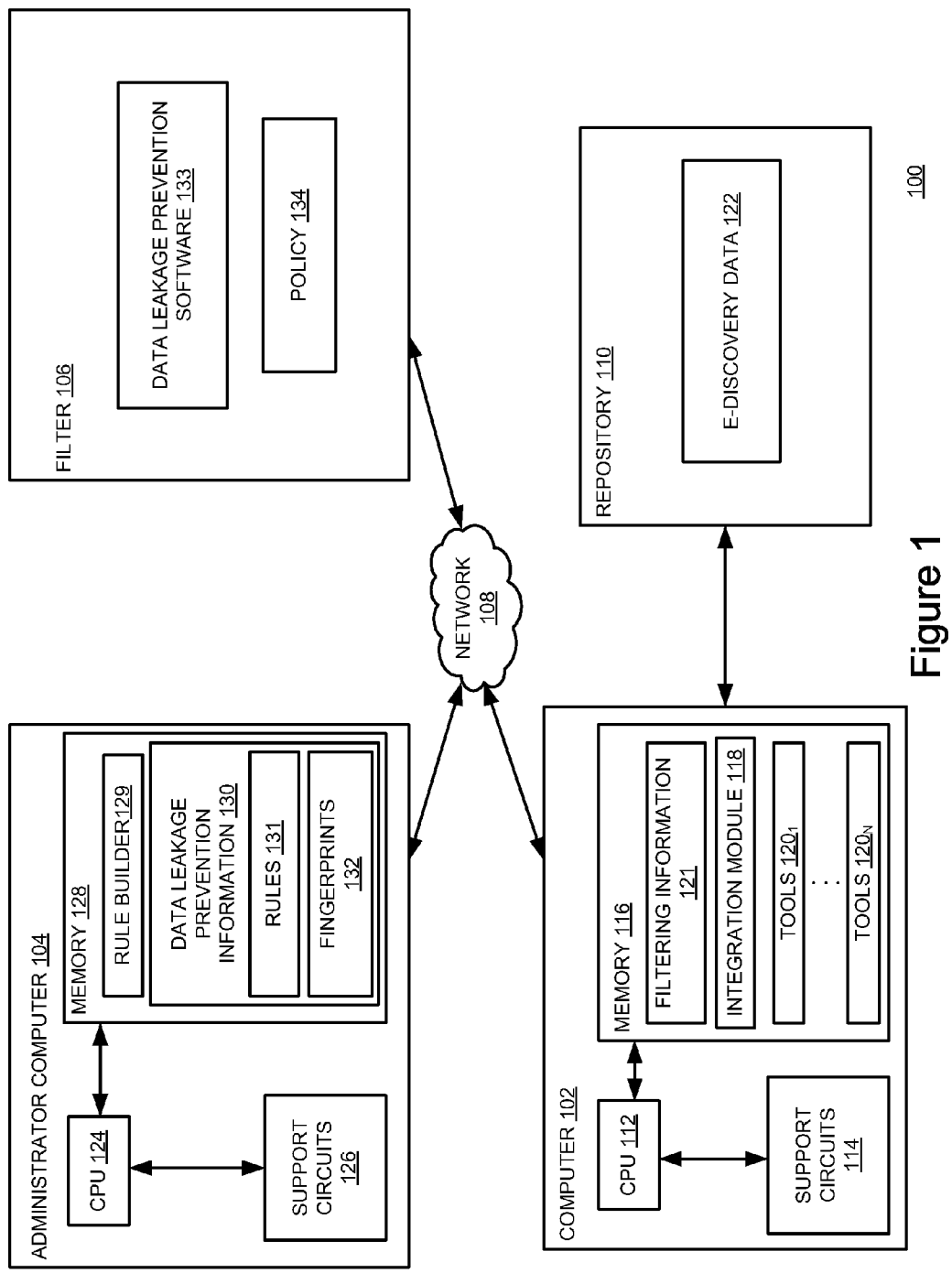
FIG. 1 is a block diagram of a system for providing data leakage prevention for e-discovery data items in accordance with one or more embodiments of the present invention.

FIG. 1 is a block diagram of a system 100 for providing data leakage prevention for e-discovery data items according to one embodiment. The system 100 comprises an administrator computer 104, a computer 102 and a filter 106 where each is coupled to each other through a network 108. Further, the system 100 comprises a repository 110 coupled to the computer 102.

The computer 102 is a type of computing device (e.g., a laptop, a desktop, a Personal Digital Assistant (PDA), a tablet, a mobile phone, such as those generally known in the art). The computer 102 includes a Central Processing Unit (CPU) 112, various support circuits 114, and a memory 116. The CPU 112 may comprise one or more commercially available microprocessors or microcontrollers that facilitate data processing and storage. The support circuits 114 facilitate the operation of the CPU 112 and include one or more clock circuits, power supplies, cache, input/output circuits, and the like. The memory 116 comprises at least one of Read Only Memory (ROM), Random Access Memory (RAM), disk drive storage, optical storage, removable storage and/or the like. The memory 116 includes various data, such as filtering information 121. The memory 116 further includes various software packages, such as an integration module 118 and various tools 120, such as a tool $120_1$ ... a tool $120_n$.

The administrator computer 104 is a type of computing device (e.g., a laptop, a desktop, a Personal Digital Assistant (PDA), a mobile phone and/or the like) that includes a Central Processing Unit (CPU) 124, various support circuits 126, and a memory 128. The CPU 124 may comprise one or more commercially available microprocessors or microcontrollers that facilitate data processing and storage. The support circuits 126 facilitate the operation of the CPU 124 and include one or more clock circuits, power supplies, cache, input/output circuits, and the like. The memory 128 comprises at least one of Read Only Memory (ROM), Random Access Memory (RAM), disk drive storage, optical storage, removable storage, and the like. The memory 128 includes various software packages, such as a rule builder 129. The memory 128 further includes various data, such as data leakage prevention information 130.

The filter 106 is configured to monitor data traffic in and/or out of the system 100. In one embodiment, the filter 106 includes data leakage prevention software 133 that is configured to prevent leakage of one or more data items in accordance with a policy 134 (e.g., a data leakage prevention policy). In one embodiment, the filter 106 may be an endpoint device, such as a gateway or a USB driver. The filter 106 may be designed to monitor for data leakage at any protocol level: network level (e.g., TCP/IP), session level (e.g., HTTP, FTP) or application level (e.g., email software, such as GOOGLE Gmail or MICROSOFT Outlook). Alternatively, the filter 106 may also reside within an email server (e.g., MICROSOFT Exchange Server) or an email client (e.g., a MICROSOFT Outlook plug-in).

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the internet or intranet using various communications infrastructure such as Ethernet, WiFi, WiMax, General Packet Radio Service (GPRS), and the like.

The repository 110 is a storage system, such as those generally known in the art. In one embodiment, the repository 110 stores organizational data in one or more databases, such as confidential data, financial data and the like. In one or more embodiments, the repository 110 stores various data items (e.g., confidential data, historical data (e.g., e-discovery data in backup tapes), attorney-client privileged data, litigation data, invention related data, health records, social security numbers, credit card numbers and the like). The repository 110 includes e-discovery data 122. In one embodiment, the e-discovery data 122 includes one or more e-discovery data items. In one embodiment, the e-discovery data items are associated with e-discovery tools, such as the tools 120 (e.g., case management data, analytical data, review data, email data (archive) and/or the like).

In one or more embodiments, the tools 120 are e-discovery tools in which electronic data is identified, located, selected, secured and examined with the intent of using the electronic data as evidence in a civil or criminal legal case. Generally, the tools 120 may include one or more case management tools (e.g., FTI Ringtail, CT Summation), review tools, analytical tools (e.g., Clearwell Systems, MetaLincs, Stratify) and the like. In one or more embodiment, the tools 120 provides a user interface with an option for selecting one or more of the e-discovery data items for data leakage prevention. The one or more e-discovery data items may be selected from aggregated data types, such as MICROSOFT Exchange Databases. As an example and not as a limitation, a case management tool may be used to configure data items as privileged and/or confidential. As such, the case management tool provides an option to select one or more privileged data items for data leakage prevention. In one embodiment, the selected e-discovery data items are communicated to the integration module 118.

According to various embodiments of the present invention, the integration module 118 communicates with the tools 120 and processes the one or more selected e-discovery data items to generate the filtering information 121. In one embodiment, the integration module 118 includes one or more connectors for accessing various data sources (e.g., a repository, a database (e.g., a MICROSOFT Exchange or a SharePoint database) and/or the like) used by the tools 120. Through an interface provided by any one of the tools 120, one or more e-discovery data items are selected for data leakage prevention. Alternatively, the e-discovery data items may be automatically selected for data leakage prevention under certain conditions (e.g., attorney-client communications, documents under legal hold, documents marked for review and/or the like). Subsequently, the integration module 118 accesses the selected one or more e-discovery data items from the e-discovery data 122 in the repository 110. Then, the integration module 118 generates and communicates the filter information 121 to the admin computer 104.

In one embodiment, the filtering information 121 defines one or more parameters for filtering the selected e-discovery data items, such as content, type, author, size, date, name, folder, authorized recipient/sender, geographic location and/or the like. For example, the filtering information 121 includes a whitelist of email addresses (e.g., email addresses for the attorneys) that are allowed to receive the e-discovery data items that are privileged and/or confidential. In addition, the filtering information 121 may include a date on which one or more e-discovery data items are no longer privileged and/or confidential. As another example, the filtering information 121 may indicate one or more geographic locations that are not to receive the e-discovery data items (e.g., Nigeria, Russia, Outside US and/or the like). As yet another example, the filtering information 121 indicates one or more authorized individuals (e.g., authorized Internet Protocol (IP) addresses) for communicating the one or more e-discovery data items outside the organization.

According to various embodiments of the present invention, the rule builder 129 and the integration module 118 cooperate to automatically configure the selected one or more e-discovery data items for data leakage prevention. In one embodiment, the rule builder 129 includes software code that processes the filtering information 121 in order to generate the data leakage prevention information 130. In one embodiment, the data leakage prevention information 130 includes one or more rules 131 and one or more fingerprints 132. The data leakage prevention information 130 may be propagated to the filter 106 to facilitate construction of the policy 134. Alternatively, the data leakage prevention information 130 is communicated to a mail server (e.g., MICROSOFT Exchange Server) for filtering emails, in which the rules 131 and/or the fingerprints 132 are used to prevent leakage of the selected at least one e-discovery data item via email (e.g., through a message body or an attachment).

According to various embodiments of the present invention, the rules 131 may be propagated to the filter 106 as an update. In one embodiment, the rules 131 include one or more signatures (e.g., keywords, patterns, phrases, regular expressions and/or the like). In another embodiment, the rules 131 include one or more learning rules (e.g., a neural network in the form of p-code) or pluggable logic (e.g., binary plug-ins or extensions). The rules 131 may include data leakage prevention rules for filtering the selected one or more e-discovery data items based on type, name and/or content.

For example, the rules 131 may indicate one or more source code files that are to be blocked at the filter 106. Such rules may be used to classify a data item as a source code file and block accordingly. As another example, the rules 131 may indicate one or more privileged data items that are to be blocked unless a recipient is an authorized email address associated with legal counsel. Furthermore, the rules 131 may be based on regulatory and/or compliance obligations (e.g., The Health Insurance Portability and Accountability Act (HIPAA) prohibits the disclosure of patient data). As such, the rules 131 may include a data leakage prevention rule that identifies patient data within an e-discovery data item and blocks any future transmission of the e-discovery data item outside the organization. As yet another example, the rules 131 may include a data leakage prevention rule for stopping a transmission of any PDF file that includes the text "Privileged and Confidential Attorney-Client Communication."

According to various embodiments of the present invention, the fingerprints 132 may include one or more unique patterns (e.g., a pattern of data, such as words) that identify one or more markers in the selected one or more e-discovery data items. The fingerprints 132 may be one or more scanned portions of the selected e-discovery data items. In one embodiment, the fingerprints 132 may be based on a natural language technique, such as n-grams. In another embodiment, the fingerprints 132 may be checksums. In one embodiment, the fingerprints 132 are examined against monitored data traffic at the filter 106 to identify one or more data items of the selected one or more e-discovery data items that are to be transmitted to an external location. If there is a match between the fingerprints 132 and the one or more data items, then the transmission of the one or more data items is blocked. In another embodiment, an administrator may be notified as to a potential leakage of the one or more data items. In a yet another embodiment, the endpoint may encrypt the one or more data items before transmission.

In one or more embodiments, the data leakage prevention software 133 prevents data leakage of the e-discovery data items based on the policy 134. In one embodiment, the data leakage prevention software 133 monitors data traffic at one or more endpoints (e.g., gateways, USB drives, ports and the like) for any potential data leakage using the policy 134. In one or more embodiments, the data leakage prevention software 133 processes the data leakage prevention information 130 to construct the policy 134 based on the rules 131 and/or the fingerprints 132.

As an example and not as a limitation, confidential and privileged data of an organization is e-discovery by archival software (e.g., SYMANTEC Enterprise Vault) and stored in the repository 110. Various e-discovery tools, such as the tools 120, are used to access, review and/or configure the e-discovery data 122 for regulatory compliance, litigation and/or the like. In one embodiment, the e-discovery tools provide a user interface with an option to select one or more data items of the e-discovery data 122 for data leakage prevention. In one or more embodiments, the e-discovery tools may be used to select the one or more e-discovery data items. In another embodiment, the one or more e-discovery data items are automatically selected for data leakage prevention by the e-discovery tools (e.g., Attorney Client privileged communications that are identified and marked as "privileged" during a legal review are automatically selected for leakage prevention). Upon such a selection, the integration module 118 utilizes the one or more selected e-discovery data items to automatically generate the filtering information 121. In one or more embodiments, the filtering information 121 specifies various parameters for controlling the disclosure of the selected one or more e-discovery data items.

In one embodiment, the filtering information 121 is used by the rule builder 129 to generate data leakage prevention information 130 (e.g., compute the fingerprints 132 and/or the rules 131) that is communicated to the filter 106 where the data leakage prevention software 133 constructs the policy 134 to protect the selected one or more e-discovery data items from undesired disclosure. Hence, the filter 106 monitors data traffic using the data leakage prevention software 133 and the policy 134. In operation, the data leakage prevention software 133 extracts a data item from the data traffic and compares the data item with the policy 134. If the comparison indicates that the data item is confidential, the data leakage prevention software 130 blocks the transmission of the data item.

For example, if an e-discovery tool establishes a legal hold on one or more data items, one or more rules may be created to block the transmission of the one or more data items to an external location (e.g., opposing legal counsel, competitors and/or the like). As another example, if an e-discovery tool, such as a case management tool (e.g., SYMANTYEC Enterprise Vault Discovery Accelerator, CT Summation, FTI Ringtail, Case Central and/or the like) specifies one or more data items as "pending review", one or more rules may be created to prevent the disclosure of the one or more data items to unwanted parties (e.g., an opposing party, members of the press and/or the like). As yet another example, if an e-discovery tool, such as a case management tool or a review tool, sets one or more data items as "privileged" until a particular date, then one or more rules may be created to prevent leakage of the one or more data items until the particular date is reached. In yet another example, if an e-discovery tool marks one or more data items as responsive or relevant, one or more rules may be created to prevent a disclosure of the one or more data items until an associated case resolves or, otherwise, concludes.

Alternatively, a surveillance solution for archival software (e.g., Enterprise Vault Compliance Accelerator) is designed to capture messages (e.g., emails, instant messages and/or the like) en route to the repository 110 to be archived. The surveillance solution examines the messages to identify one or more messages for review by compliance authorities. As a result, the one or more messages may be selected for data leakage prevention according to one or more embodiments. Hence, one or more rules may be created to block a transmission of the one or more messages to an external location.

Figure 2:
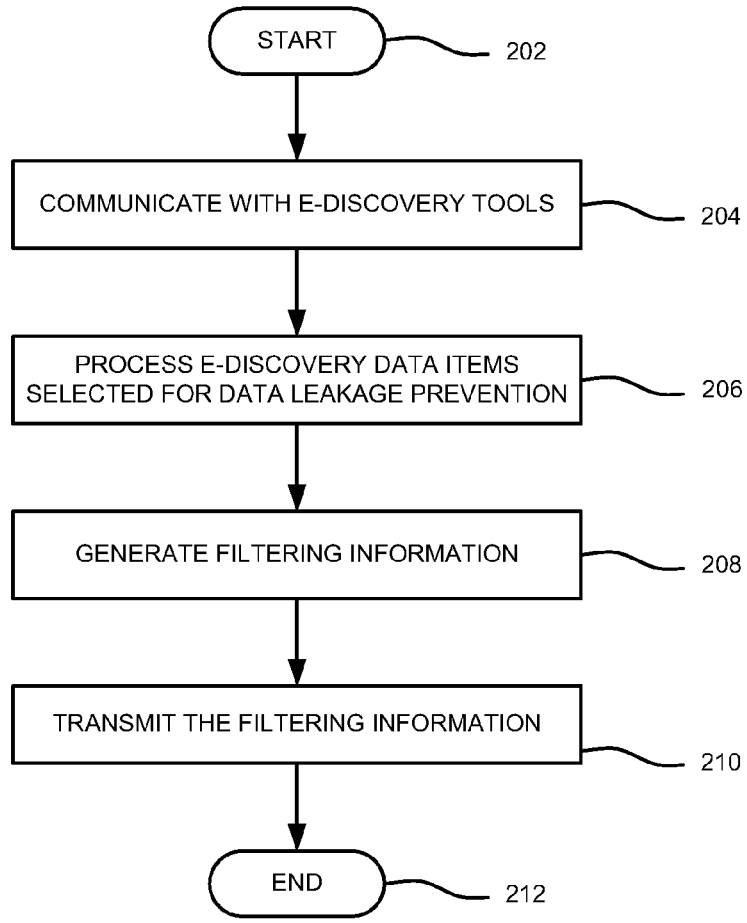
FIG. 2 is a flow diagram of a method for providing data leakage prevention for e-discovery data items in accordance with one or more embodiments of the present invention.

FIG. 2 is a flow diagram of a method 200 for providing data leakage prevention for e-discovery data items according to one embodiment. The method 200 starts at step 202 and proceeds to step 204, at which an integration module communicates with an e-discovery tool (e.g., the tools 120 of FIG. 1).

In one embodiment, the e-discovery tool provides a user interface that is coupled to a repository as well as an option to select one or more e-discovery data items (e.g., data items in the e-discovery data 122 of FIG. 1) for data leakage prevention. In another embodiment, the one or more e-discovery data items may be automatically selected for data leakage prevention by the e-discovery tool (e.g., the tools 120 of FIG. 1). At step 206, the one or more e-discovery data items selected for data leakage prevention are processed. At step 208, filtering information (e.g., the filtering information 121 of FIG. 1) is generated (e.g., by the integration module 118 of FIG. 1). At step 210, the filtering information (e.g., the filtering information 121 of FIG. 1) is transmitted (e.g., by the integration module 118 to the admin computer 104 of FIG. 1). The method 200 proceeds to step 212, at which the method 200 ends.

Figure 3:
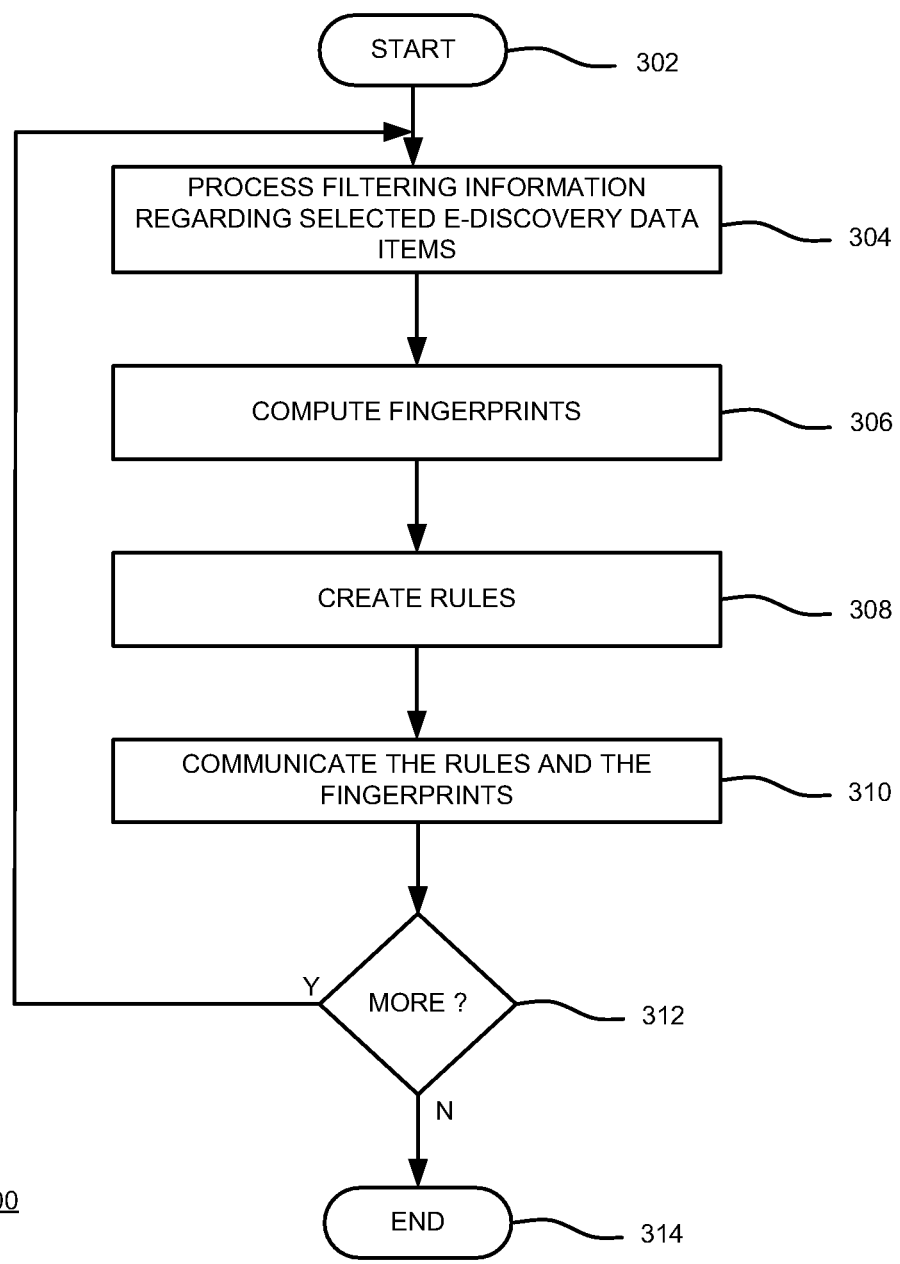
FIG. 3 is a flow diagram of a method for generating data leakage prevention information in accordance with one or more embodiments of the present invention.

FIG. 3 is a flow diagram of a method 300 for generating data leakage prevention information according to one embodiment. The method 300 starts at step 302 and proceeds to step 304, at which filtering information (e.g., the filtering information 121 of FIG. 1) regarding one or more e-discovery data items is processed. At step 306, one or more fingerprints (e.g., the fingerprints 132 of FIG. 1) are computed (e.g., by the rule builder 129). At step 308, one or more data leakage prevention rules (e.g., the rules 131 of FIG. 1) are created (e.g., by the rule builder 129) to filter the selected e-discovery data items. At step 310, the one or more fingerprints and the one or more data leakage prevention rules are communicated to a filter (e.g., the filter 106 of FIG. 1).

The method 300 proceeds to step 312, at which a determination is made as to whether there is more filtering information to be processed. If, it is determined that there are more e-discovery data items to be automatically configured for data leakage prevention (option "YES") then the method 300 returns to step 304. If, at step 312 it is determined that there are no more e-discovery data items to be automatically configured for data leakage prevention (option "NO"), then the method 300 proceeds to step 314, where the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for automatically configuring e-discovery data for data leakage prevention, comprising:
    automatically selecting at least one e-discovery data item for data leakage prevention, wherein the at least one e-discovery data item comprises data associated with a legal court case and is automatically selected for data leakage prevention by at least one e-discovery tool based on the at least one e-discovery data item being identified as at least one of privileged, subject to legal hold, and marked for review;
    accessing the automatically selected at least one e-discovery data item to automatically generate filtering information, wherein the filtering information defines at least one parameter for controlling a disclosure of the automatically selected at least one e-discovery data item, wherein the filtering information comprises a whitelist associated with the automatically selected at least one e-discovery data item, and wherein the whitelist comprises at least one authorized recipient for the automatically selected at least one e-discovery data item;
    generating data leakage prevention information for the automatically selected at least one e-discovery data item, wherein the data leakage prevention information is based on at least one fingerprint and at least one rule, wherein the data leakage prevention information is used to filter the automatically selected at least one e-discovery data item, and wherein the at least one rule comprises at least one data leakage prevention rule for filtering the automatically selected at least one e-discovery data item based on one or more of type, name, and content; and
    communicating with an e-discovery tool to identify the automatically selected at least one e-discovery data item, wherein the at least one e-discovery tool is configured to provide a user interface communicatively coupled to a repository based on the at least one e-discovery data item automatically selected for data leakage prevention.

2. The method of claim 1, wherein generating the data leakage prevention information further comprises computing at least one fingerprint from the automatically selected at least one e-discovery data item.

3. The method of claim 1, wherein generating the data leakage prevention information further comprises creating at least one rule based on the automatically selected at least one e-discovery data item.

4. The method of claim 1, wherein generating the data leakage prevention information further comprises using the data leakage prevention information to construct a policy for preventing data leakage of the automatically selected at least one e-discovery data item.

5. The method of claim 4 further comprising filtering data traffic in accordance with the policy to prevent data leakage of the automatically selected at least one e-discovery data item.

6. The method of claim 1, further comprising examining a plurality of messages to be archived to identify at least one message of the plurality of messages for review, wherein the filtering information is automatically generated based on the at least one message.

7. An apparatus for automatically configuring e-discovery data for data leakage prevention, comprising:
    a memory comprising data leakage prevention information;
    a rule builder configured to generate the data leakage prevention information for at least one e-discovery data item that comprises data associated with a legal court case and is automatically selected for data leakage prevention by at least one e-discovery tool based on the at least one e-discovery data item being identified as at least one of privileged, subject to legal hold, and marked for review, wherein the data leakage prevention information is based on at least one fingerprint and at least one rule, wherein the data leakage prevention information is used to filter the automatically selected at least one e-discovery data item, wherein the at least one rule comprises at least one data leakage prevention rule for filtering the automatically selected at least one e-discovery data item based on one or more of type, name, and content, wherein filtering information for filtering the automatically selected at least one e-discovery data item comprises a whitelist associated with the selected at least one e-discovery data item, and wherein the whitelist comprises at least one authorized recipient for the automatically selected at least one e-discovery data item; and
    an integration module configured to communicate with an e-discovery tool to identify the automatically selected at least one e-discovery data item, wherein the at least one e-discovery tool is configured to provide a user interface communicatively coupled to a repository based on the at least one e-discovery data item automatically selected for data leakage prevention, wherein the integration module accesses the automatically selected at least one e-discovery data item to automatically generate the filtering information, wherein the filtering information is communicated to the rule builder.

8. The apparatus of claim 7, wherein the rule builder computes at least one fingerprint from the automatically selected at least one e-discovery data item.

9. The apparatus of claim 7, wherein the rule builder creates at least one rule based on the automatically selected at least one e-discovery data item.

10. The apparatus of claim 7, wherein the rule builder uses the data leakage prevention information to construct a policy for the automatically selected at least one e-discovery data item.

11. The apparatus of claim 7 further comprising data leakage prevention software for monitoring data traffic to filter the automatically selected at least one e-discovery data item in accordance with a policy.

12. A system for automatically configuring e-discovery data for data leakage prevention, comprising:
    a first computer coupled to a repository for storing e-discovery data, comprising:
        at least one e-discovery tool for automatically selecting at least one e-discovery data item of the e-discovery data for data leakage prevention based on the at least one e-discovery data item being identified as at least one of privileged, subject to legal hold, and marked for review, wherein the at least one e-discovery data item comprises data associated with a legal court case; and an integration module for processing the automatically selected at least one e-discovery data item to automatically generate filtering information to control disclosure of the automatically selected at least one e-discovery data item, and for communicating with an e-discovery tool to identify the automatically selected at least one e-discovery data item, wherein the at least one e-discovery tool is configured to provide a user interface communicatively coupled to a repository based on the at least one e-discovery data item automatically selected for data leakage prevention;

a second computer, comprising:

a rule builder for processing the filtering information to compute at least one fingerprint and create at least one rule for preventing data leakage of the automatically selected at least one e-discovery data item, wherein the at least one rule comprises at least one data leakage prevention rule for filtering the automatically selected at least one e-discovery data item based on one or more of type, name, and content, wherein the filtering information comprises a whitelist associated with the automatically selected at least one e-discovery data item, and wherein the whitelist comprises at least one authorized recipient for the automatically selected at least one e-discovery data item; and a filter, comprising:

data leakage prevention software for processing the at least one fingerprint and the at least one rule to construct a policy that is used to prevent data leakage of the automatically selected at least one e-discovery data.

* * * * *